(12) United States Patent
Kirk (10) Patent No.: US 7,032,964 B2
(45) Date of Patent: Apr. 25, 2006

(54) STORAGE APPARATUS FOR AUTOMOBILE REMOVABLE ROOF PANELS

(76) Inventor: Albert W. Kirk, 7013 Sourwood La., Fort Washington, MD (US) 20744

( * ) Notice: Subject to any disclaimer, the term of this patent is extended or adjusted under 35 U.S.C. 154(b) by 0 days.

(21) Appl. No.: 10/953,779

(22) Filed: Sep. 30, 2004

(65) Prior Publication Data

US 2006/0066140 A1 Mar. 30, 2006

(51) Int. Cl.
*B60J 7/11* (2006.01)
*B60R 11/00* (2006.01)

(52) U.S. Cl. ............... 296/218; 224/539; 211/41.1

(58) Field of Classification Search ............ 296/218; 224/539, 541; 211/41.1, 41.11
See application file for complete search history.

(56) References Cited

U.S. PATENT DOCUMENTS

| | | | |
|---|---|---|---|
| 3,635,518 A * | 1/1972 | Eger | ............ 296/76 |
| 4,171,078 A | 10/1979 | Morgan | |
| 4,467,944 A | 8/1984 | Manko et al. | |
| 4,717,192 A * | 1/1988 | Iwamura et al. | ......... 296/37.1 |
| 5,193,874 A | 3/1993 | German et al. | |
| 5,513,891 A * | 5/1996 | Horiuchi | ............. 296/37.1 |
| 6,497,351 B1 | 12/2002 | Peele, Jr. | |
| 6,926,330 B1 * | 8/2005 | Scholz et al. | ............. 296/37.1 |

FOREIGN PATENT DOCUMENTS

JP  05229347 A  9/1993

* cited by examiner

*Primary Examiner*—Dennis H. Pedder
(74) *Attorney, Agent, or Firm*—Richard C. Litman (57) ABSTRACT

The storage apparatus for removable roof panels of an automobile includes a roof panel rack having a base member, a top member, and at least one support member joining the base and top members such that the base and top members are separated by a distance substantially equal to the at least one support member. The at least one support member includes at least one bearing support that is adapted to supportively receive the removable roof panel and a locking bar. A locking bar body having a locking bar and a locking bar cover is operatively coupled to the roof panel rack and is designed and configured to secure at least one removable roof panel. A protective cover is disposed between two removable roof panels. The storage apparatus is adapted to be arranged as a stand outside the automobile.

19 Claims, 7 Drawing Sheets

STORAGE APPARATUS FOR AUTOMOBILE REMOVABLE ROOF PANELS

BACKGROUND OF THE INVENTION

1. Field of the Invention

The present invention relates to storage apparatus for removable roof panels of an automobile, and more particularly to storage apparatus in the nature of a luggage and roof panel rack which may be used to safely and securely store automobile removable roof panels, and which may be easily removed and converted into a stand for storing the roof panels outside the automobile.

2. Description of the Related Art

A number of automobiles are equipped with hardtop roof structures that have removable or detachable roof panels or inserts. These types of automobiles permit the car enthusiast to partially open the cockpit or passenger area of the automobile by removing the roof panel from the hardtop roof structure. Once the roof panel is removed from the automobile, the car enthusiast can enjoy driving an automobile with an open air or convertible feeling. Moreover, an optional translucent or glass removable roof panel can be secured in the opening to further enhance the driving experience. This is accomplished by replacing the hardtop removable roof panel with the glass removable roof panel. The hardtop removable roof panel is generally made of metal or some other opaque substance that matches the exterior paint of the automobile. Usually, the car enthusiast will want to carry both types of removable roof panels during a drive in order to adapt the automobile to inclement weather conditions and to provide additional security when the automotive is parked.

Many hardtop automobiles and sports cars that come with removable roof panels include an interior compartment for storing the removable roof panel. Unfortunately, the interior compartment typically has only one fastening means for securing one removable roof panel. This means that the glass removable roof panel is placed unsecured on top of the hardtop removable roof panel creating the risk that the surface of the hardtop removable roof panel will become scratched or dented, or the glass removable roof panel will vibrate against the hardtop removable roof panel causing the glass to crack or shatter while the automobile is being driven. Hence, the car enthusiast may have to leave one of the roof panels in an alternative location, such as a garage, where the removable roof panel could be knocked over or damaged by foreign objects coming into contact with the removable roof panel.

Another problem often encountered by the car enthusiast is adequate storage space for luggage while traveling. This problem is compounded when the car enthusiast decides to store both removable roof panels in the interior of the automobile. An additional dilemma occurs when the hardtop roof structure is opened because the rear cargo cover or hatchback cover flaps in the wind while the car is being driven. A further difficulty confronted by the car enthusiast is preserving the original appearance of the interior compartment of the automobile when an alternative storage device is installed in the automobile, which requires a fastener or anchor to be used in order to secure the device to the automobile. A variety of devices have been proposed for storing removable roof panels within an automobile.

U.S. Pat. No. 4,171,078, issued Oct. 16, 1979 to Morgan, describes an adjustable storage rack that is mounted within the interior of an automobile trunk. The storage rack includes U-shaped front and rear hanger assemblies, which provide support for longitudinally disposed, telescopically related rail members. Each hanger assembly includes a pair of transversely L-shaped brackets that are attached to the upper wall of the automobile trunk and interconnected by strap members. The rail members are disposed in side-by-side relation and extend between the front and rear hanger assemblies. The rail members provide the bearing surfaces for carrying the stored articles.

U.S. Pat. No. 4,467,944, issued Aug. 28, 1984 to Manko et al., discloses a storage apparatus for automobile T-top inserts having a lower body portion that is coupled to the floor surface of the automobile. An upper body portion is hingedly coupled to the lower body portion. The upper and lower body portions define between them a cavity. The walls of the cavity provide an opposed pair of clamping surfaces, which engage the top inserts to firmly and securely clamp the inserts against each other and within the apparatus.

U.S. Pat. No. 5,193,874, issued Mar. 16, 1993 to German et al., shows a storage device for motor vehicle roof inserts. The storage device has a pair of matched storage bodies mounted in a well area of a motor vehicle and spaced apart at a distance that corresponds to the dimensions of the roof inserts. Each storage body has two channels that are contoured to mate with the opposite edge portions of the roof inserts. Four pairs of opposed rollers are mounted to the storage bodies in association with each of the channels to guide the vehicle roof inserts into the channels. The roof inserts are independently inserted into the storage apparatus by sliding the inserts into the channels.

U.S. Pat. No. 6,497,351, issued Dec. 24, 2002 to Peele, Jr., describes a multi-compartment bag assembly for protecting and storing one or two hardtops of a coupe top automobile. The bag assembly includes a first compartment and a second compartment. The first and second compartments are defined by overlying exterior and interior walls that are joined together at a seam to define an open space therein. Each compartment has an open end to receive the hardtop for storage. A closure flap is located at the open end to close the opening of the compartment.

The Japanese patent No. 5-229347, published Sep. 7, 1993, discloses a holding rack for roof panels stored in the trunk of a vehicle. The rack pivots upwardly from underneath the trunk lid.

For the forgoing reasons, there is a need for a storage apparatus that will safely store and secure both removable roof panels and provide additional storage space for luggage in the interior of the automobile, while preserving the originality of the automobile. There is a further need for a storage apparatus that can be easily removed from the automobile and arranged as a stand to safely store a pair of removable roof panels outside the automobile.

None of the above inventions and patents, taken either singly or in combination, is seen to describe the instant invention as claimed. Thus, a storage apparatus for storage of automobile removable roof panels solving the aforementioned problems is desired.

SUMMARY OF THE INVENTION

The present invention is directed to a storage apparatus for storage of automobile removable roof panels. The storage apparatus satisfies the need to safely store and secure a pair of removable roof panels and to provide additional storage space for luggage in the interior of the automobile, while preserving the originality of the automobile. Furthermore, the present invention satisfies the need for a storage apparatus that can be easily removed from the interior of the automobile and arranged as a stand outside the automobile to safely store the removable roof panels.

The storage apparatus comprises a roof panel rack, a protective cover, and a locking bar body. The locking bar body includes a locking bar having an open space therein for storing small items and a locking bar cover disposed on the locking bar. The locking bar is operatively coupled to the roof panel rack and is designed and configured to secure at least one removable roof panel when the storage apparatus is arranged as a stand outside the automobile.

Advantageously, the locking bar cover also provides a space to safely secure luggage while traveling. Further, the locking bar cover provides a means to securely hold the edge of a rear cargo or hatchback cover of the automobile, thereby preventing the hatchback cover from flapping in the wind.

The roof panel rack includes a base member, a top member, and at least one support member that is joined between the base and top members such that the base and top members are separated by a distance substantially equal to the at least one vertical support. The support member has at least one bearing support that is adapted to supportively receive the removable roof panel and the locking bar.

The protective cover is disposed on the exterior surface of at least one removable roof panel. Where a pair of removable roof panels is being stored in the interior compartment of the automobile or outside the automobile when the roof panel rack and locking bar are arranged as a stand, the protective cover is sandwiched between the removable roof panels to protect them from damage, such as scratches, dents, and abrasions.

The locking bar and locking bar cover are operatively coupled to the roof panel rack and are disposed between the roof panel rack and the interior compartment to securely hold the roof panel rack in position. Accordingly, the roof panel rack and the locking bar body are designed and configured to generally conform to and frictionally engage the interior compartment of the automobile. For example, the locking bar is disposed between the base member and the interior compartment of the automobile to create a wedge that locks the roof panel rack within the automobile, so that the roof panel rack is maintained and held in position relevant to the interior compartment.

Advantageously, this type of configuration eliminates the need to fasten or anchored the storage apparatus to the interior compartment. Therefore, preserving the original appearance of the automobile when the storage apparatus is removed from the interior compartment.

One aspect of the invention is to allow a car enthusiast to safely store and secure at least one removable roof panel within an automobile. Another aspect of the invention is to allow the car enthusiast to easily remove a storage apparatus from the interior compartment of an automobile while still preserving the originality of the automobile. Still another aspect of the invention is to arrange the storage apparatus as a stand for storing a pair of removable roof panels outside the automobile.

A further aspect of the invention is to provide additional storage in the interior of the locking bar body for small items, such as umbrellas, keys, reading material, and other items. Still another aspect of the invention is to provide additional storage space for luggage.

The invention provides for improved elements and arrangements thereof for the purposes described which are inexpensive, dependable and fully effective in accomplishing their intended purposes.

A clear understanding of the present invention will become readily apparent upon further view of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to a storage apparatus for automobile removable roof panels, designated generally as 10 in the drawings.

Figure 1A:
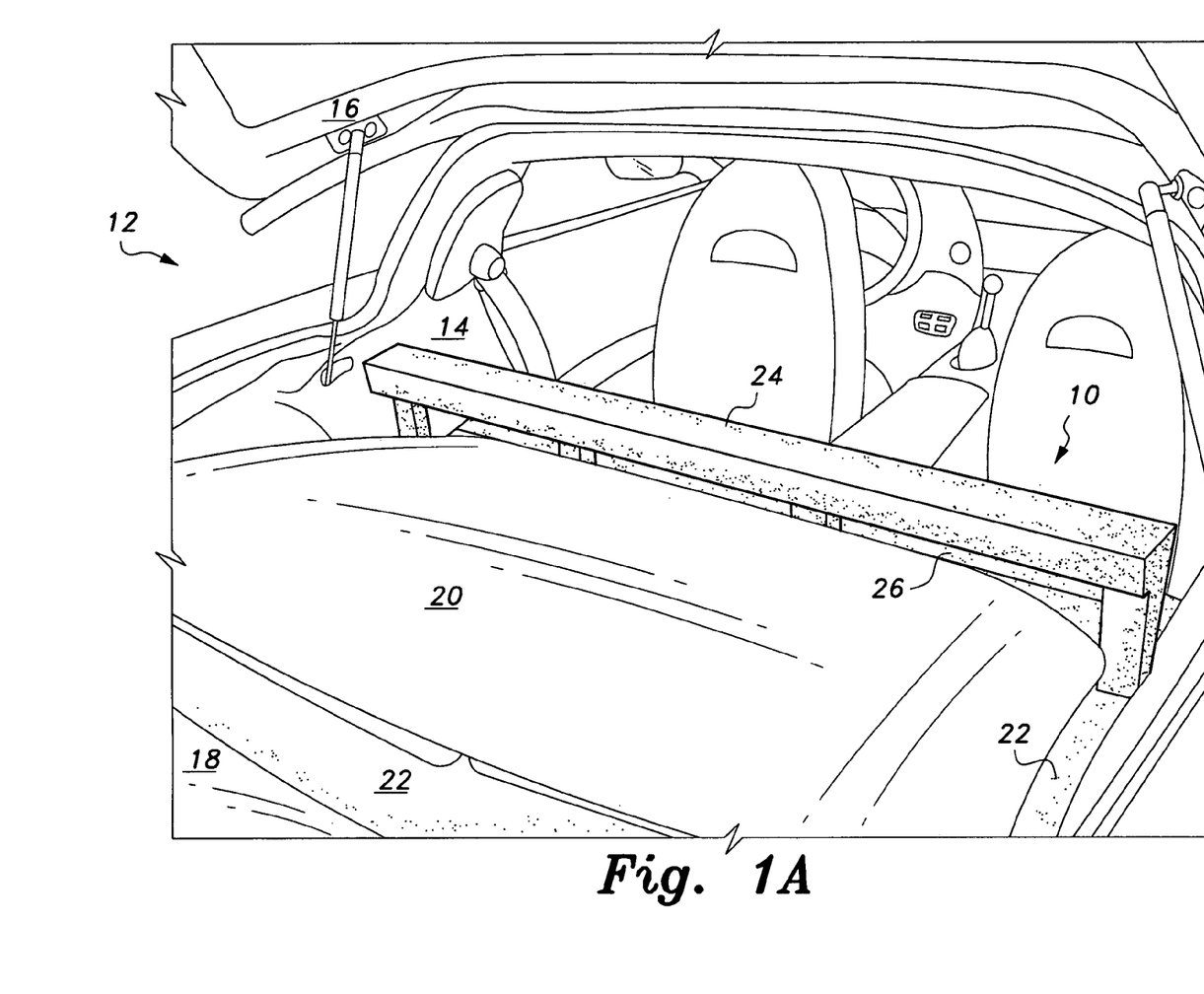
FIG. 1A is an environmental, perspective view of a storage apparatus for automobile removable roof panels according to the present invention looking in from the rear of an automobile.
Figure 1B:
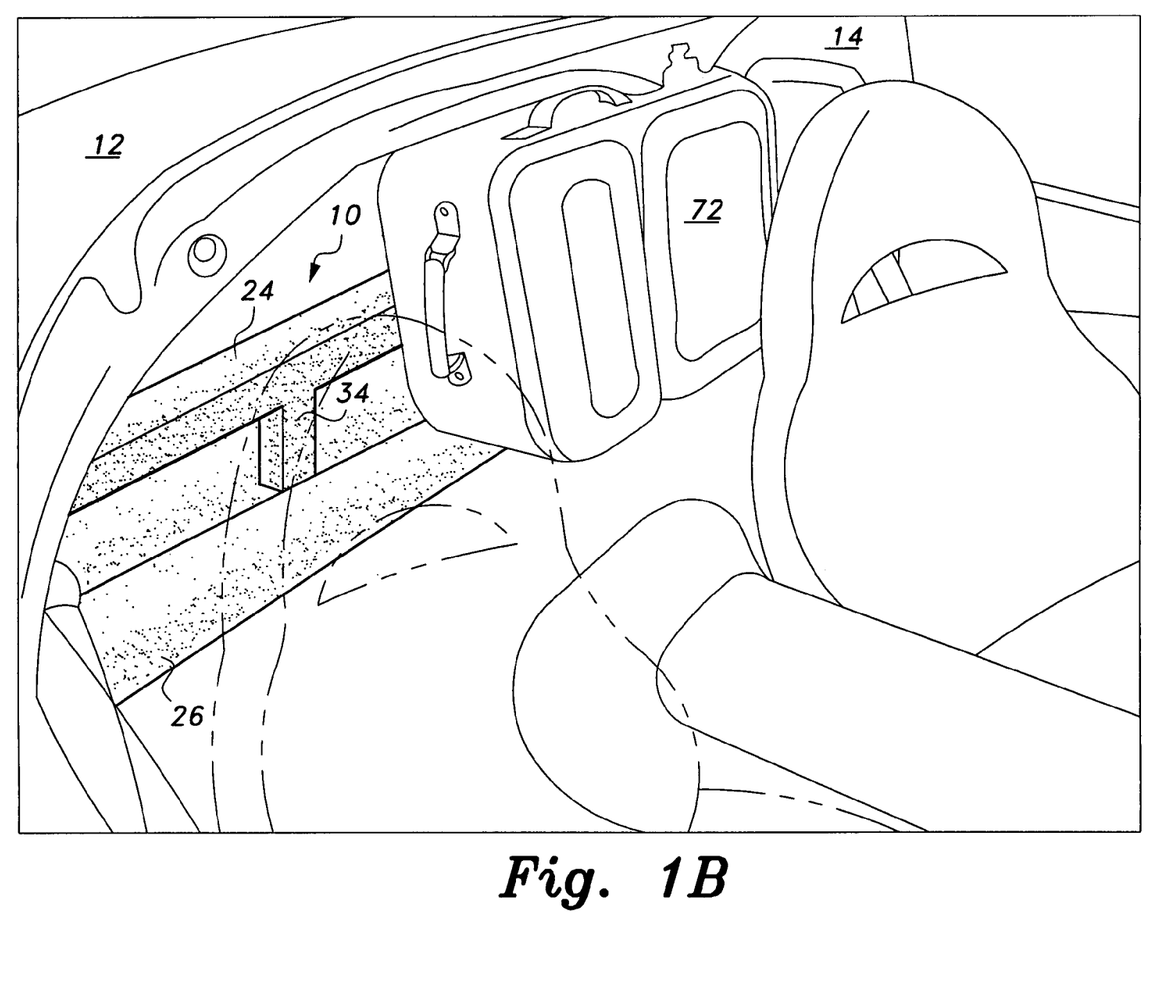
FIG. 1B is an environmental, perspective view of a storage apparatus for automobile removable roof panels according to the present invention looking in from the front of an automobile.

As illustrated in FIGS. 1A and 1B, the storage apparatus 10 is seen as operatively disposed within an interior compartment 14 of an automobile 12. The automobile 12 has a body style that is typically known as a "hatchback" or "liftback" construction, which allows access to the cargo or interior compartment 14 of the automobile 12 by opening the hatchback 16.

The storage apparatus 10 comprises a roof panel rack 24 and locking bar body 26 that is operatively coupled to the roof panel rack 24. The locking bar body 26 is disposed between the roof panel rack 24 and the interior compartment 14 to securely hold the roof panel rack 24 in position relevant to the interior compartment 14 of the automobile 12. Preferably, the locking bar body 26 is disposed in a manner that creates a wedge between the roof panel rack 24 and the interior compartment 14 which results in maintaining the position of the roof panel rack 24 within the automobile 12.

The roof panel rack 24 and the locking bar body 26 are designed and configured to generally conform to and frictionally engage the interior compartment 14 of the automobile 12. As a result, the interior compartment 14 geometry and dimensions of the automobile 12 will govern the overall size and shape of the storage apparatus 10. For example, for a 2003 C-5 Model Corvette Coupe, which is manufactured and sold by General Motors, Inc., the storage apparatus 10 would generally have the following dimensions: a depth of approximately 7 inches, a length of approximately 45½ inches, and a height of approximately 5 inches.

The roof panel rack 24 and the locking bar body 26 are preferably custom fitted within the automobile 12 to eliminate the need to fasten or anchor the storage apparatus 10 to the interior compartment 14. Advantageously, by eliminating the need to fasten or anchor the storage apparatus 10 within the automobile 12, the storage apparatus 10 can be easily installed and removed from the automobile 12 while still maintaining the original appearance of the interior compartment 14.

As illustrated in FIG. 1A, a pair of removable roof panels 18 and 20, respectively, are disposed in the interior compartment 14 of the automobile 12. The removable roof panel 18 is secured by a fastening means (not shown) provided by the manufacturer of the automobile 12. A protective cover 22 is disposed on an exterior surface of the removable roof panel 18. The removable roof panel 20 is disposed on top of the protective cover 22 and securely held into position by the roof panel rack 24. The protective cover 22 is sandwiched between the removable roof panels 18 and 20 to protect both removable roof panels 18 and 20 from damage, such as scratches, dents, and abrasions. The protective cover 22 can be a polymeric material, a textile material, or any other type of material that protects the removable roof panels 18, 20. For example, the protective cover 22 can be cloth, carpet, fabric, foam, pad, cushion, or rubber.

Figure 2A:
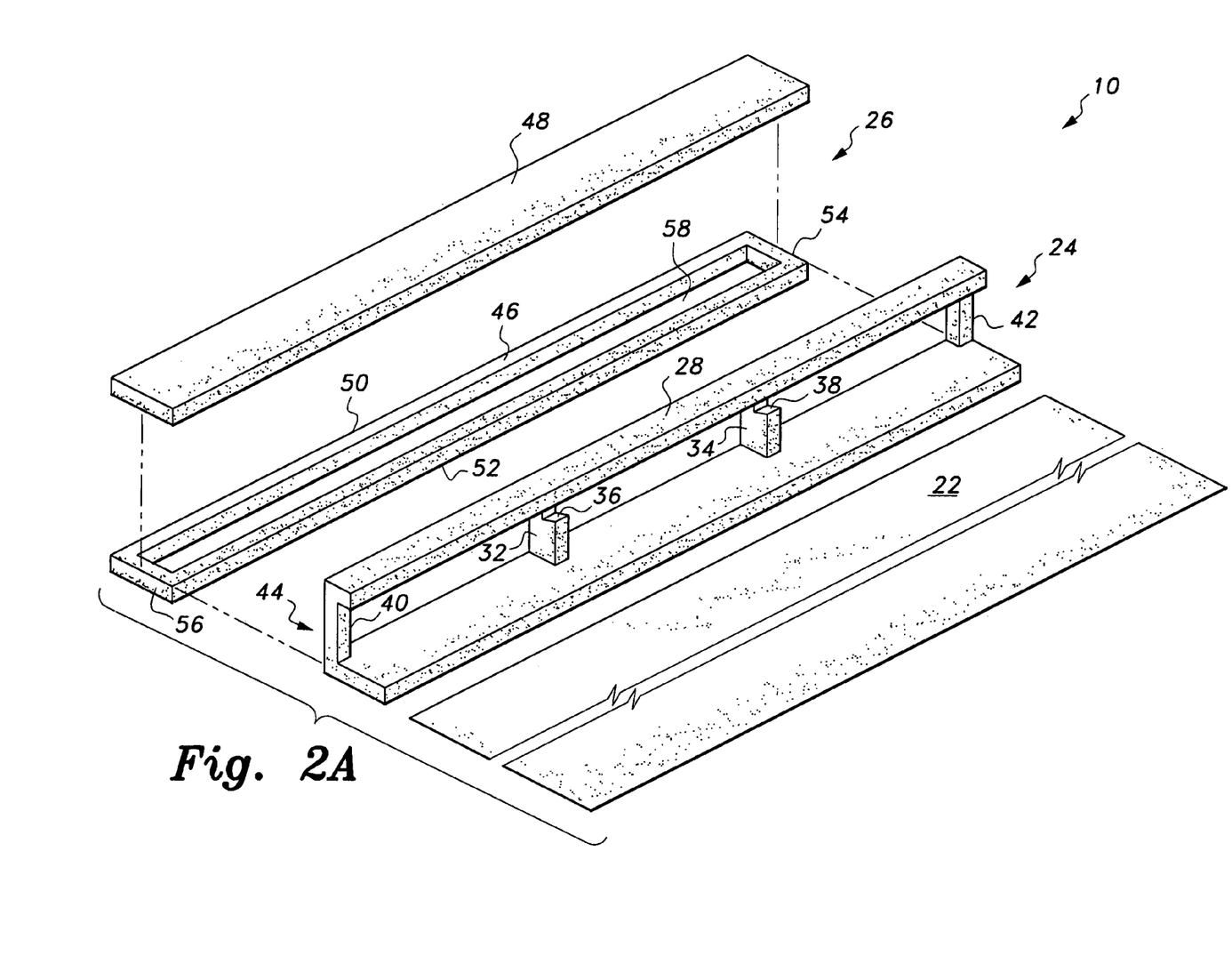
FIG. 2A is an exploded view of the embodiment of FIG. 1A.
Figure 2B:
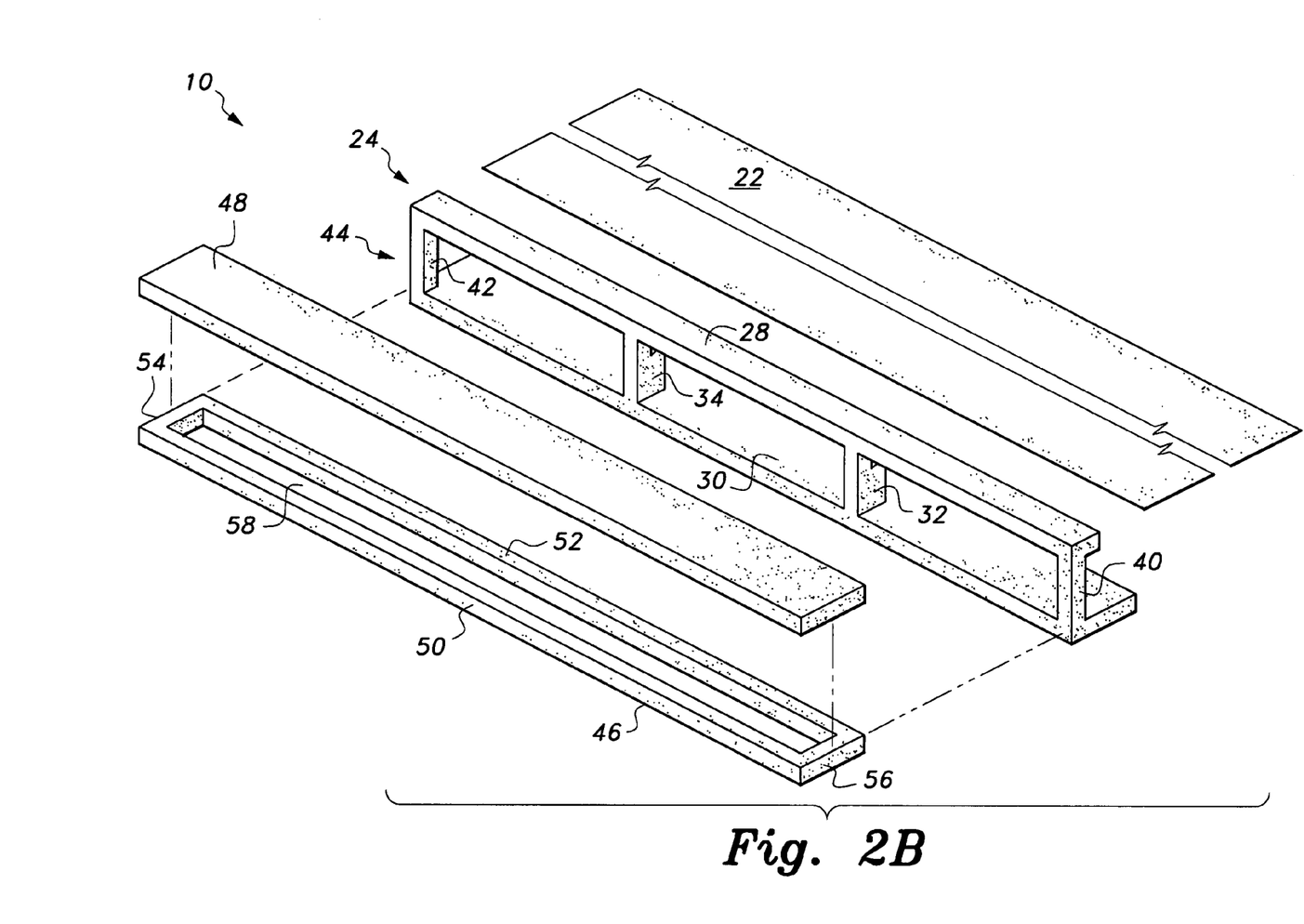
FIG. 2B is an exploded view of the embodiment of FIG. 1B.

As shown in FIGS. 1A, 2A and 2B, the roof panel rack 24 has a top member 28, a base member 30, and at least one support member 32 that joins the top and base members, 28 and 30. A distance that is substantially equal to the support member 32 separates the top member 28 and bottom member 30. The support member 32 has at least one bearing support 36 that is adapted to supportively receive the removable roof panel 20.

The roof panel rack 24 further includes a support member 34 that has at least one bearing support 38 that is adapted to receive and securely hold the removable roof panel 20. The support member 34 is joined to the top and base members 28, 30. The support members 32 and 34 are spaced apart from each other in a manner that provides adequate support to hold the removable roof panel 20. A pair of side support members 40 and 42 is joined to the opposing ends of the top and base members 28, 30 to provide further structural integrity to the roof panel rack 24 for supporting the removable roof panel 20.

Alternatively, the support members 32, 34 and the side support members 40, 42 can be configured to form a longitudinal wall 44 that has a portion thereof extending outwardly to provide at least one bearing support 36 for supportively receiving the removable roof panel 20. The longitudinal wall 44 being joined to and separating the top and base members 28 and 30 by a distance that is substantially equal to the longitudinal wall 44.

As shown in FIGS. 2A and 2B, the locking bar body 26 includes a locking bar 46 and a locking bar cover 48. The locking bar 46 has a front wall 50, a back wall 52, and a pair of opposing end walls 54 and 56 that join the front wall 50 and the back wall 52 to form a generally rectangular body having an open space 58 therein for storing items. The locking bar cover 48 is disposed on the locking bar 46 and is adapted to facilitate holding the roof panel rack 24 within the automobile 12. In addition, the locking bar cover 48 covers the open space 58 and provides a generally flat surface for placing items thereon, such as luggage 72 (as shown in FIG. 1B).

The locking bar 46 is disposed between the base member 30 and the interior compartment 14 so that a wedge is created which locks and securely holds the roof panel rack 24 within the automobile 12. Hence, the locking bar 46 is configured to any shape and size that is adaptable to securely hold the roof panel rack 24 within the automobile 12. For example, the locking bar 46 can be a platform, a square, a generally rectangular, circular, tubular, or oblong shape.

Figure 3:
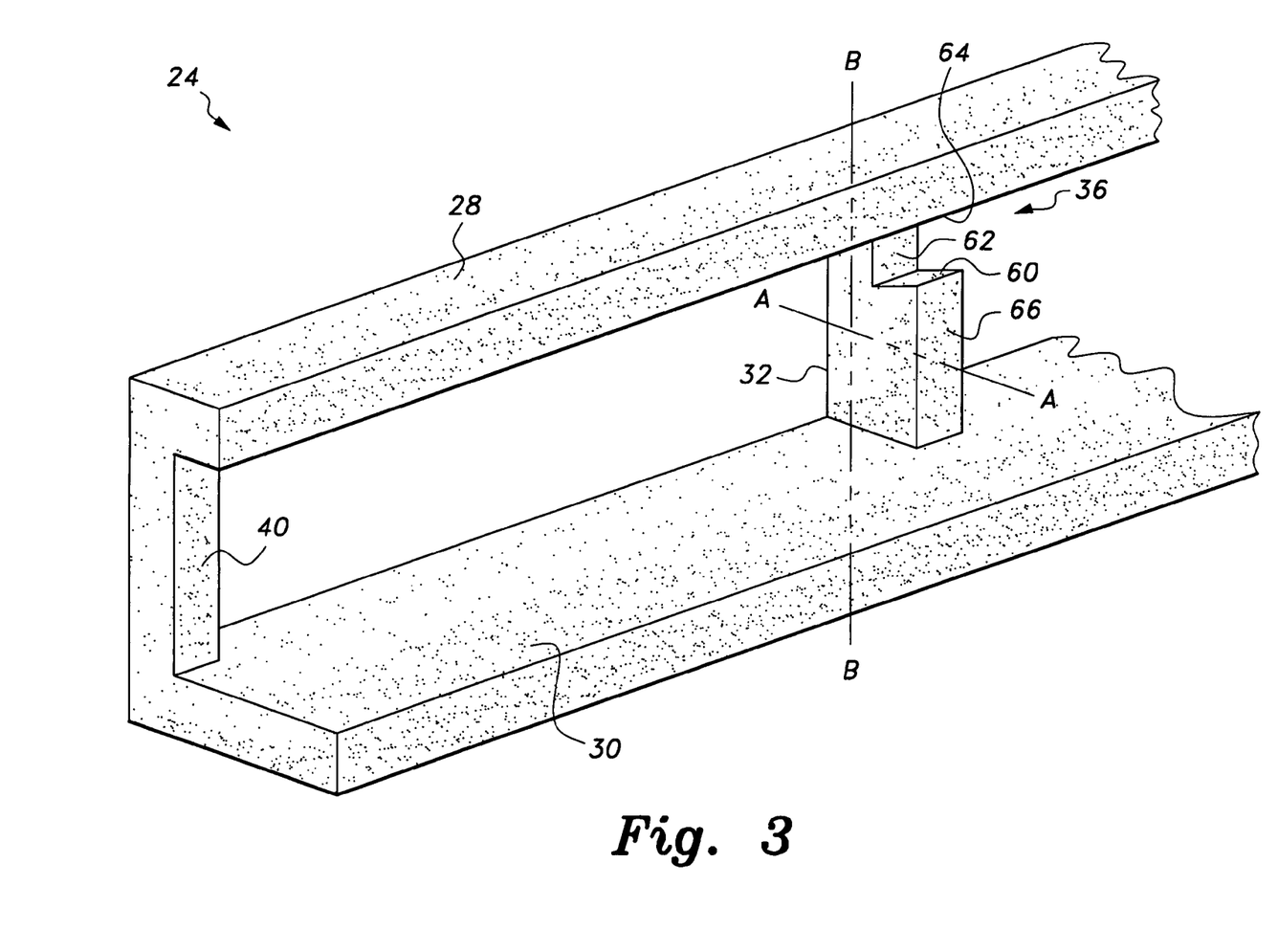
FIG. 3 is a fragmented partial view of the embodiment shown in FIG. 2A showing further details of a roof panel rack of the storage apparatus for automobile removable roof panels according to the present invention.

As shown in FIGS. 2A and 3, the bearing supports 36, 38 have a lower portion 60, a back portion 62, and an upper portion 64 that defines a recess wall structure having a plurality of bearing surfaces or ledges for supportively receiving the removable roof panel 20 and the locking bar 46. In more detail, the vertical supports 32 and 34 include a forward facing wall 66 that has a portion thereof extending inwardly along axis A—A and upwardly along axis B—B to define the lower and back portions 60 and 62 of the bearing supports 36, 38. The top member 28 extends outwardly along axis A—A to define the upper portion 64 of the bearing supports 36, 38. The bearing supports 36, 38 overall configuration can be a generally L-shaped, C-shaped, U-shaped, or any other shaped that is adaptable to receive and hold the removable roof panel 20 and the locking bar 46.

Figure 4:
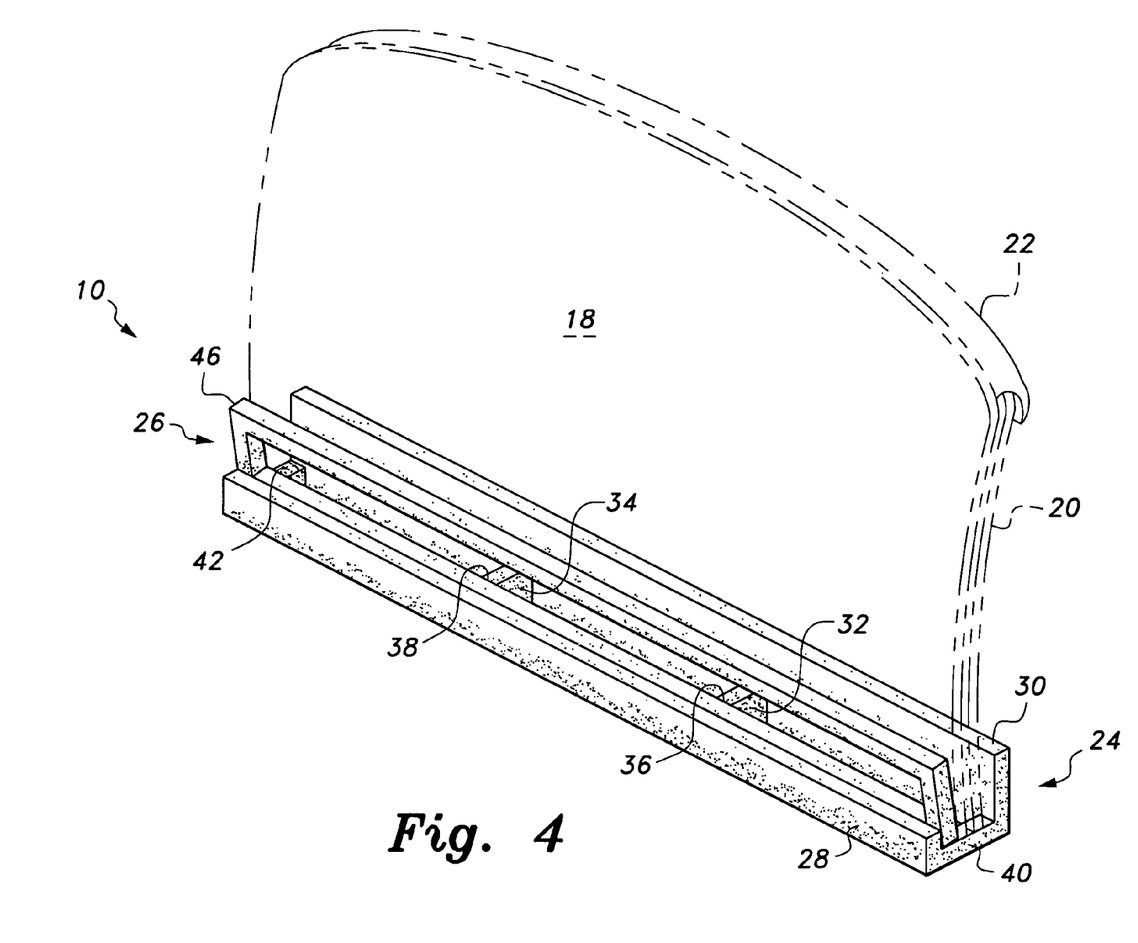
FIG. 4 is an environmental, perspective view of a storage apparatus for automobile removable roof panels according to the present invention showing the storage apparatus as a stand.

As illustrated in FIG. 4, the storage apparatus 10 is designed and configured to convert into a stand for storing the removable roof panels 18 and 20 outside the interior compartment 14 of the automobile 12. Advantageously, the removable roof panels 18, 20 can be safely stored outside the automobile 12 when cleaning the interior compartment 14.

To achieve this arrangement, the roof panel rack 24 is positioned on the ground so that the bearing supports 36, 38 of the support members 32, 34 are exposed to receive the locking bar 46 of the locking bar body 26. The removable roof panels 18 and 20 are placed in the open or exposed portion of the roof panel rack 24 with the removable roof panel 20 being adjacent to the base member 30. The protective cover 22 is disposed between the removable roof panels 18 and 20. The locking bar 46 is operatively coupled to the bearing supports 36, 38 to securely hold the removable roof panels 18, 20. Alternatively, the bearing supports 36, 38 can be adapted to supportively receive the locking bar cover 48 or locking bar body 26.

Figure 5:
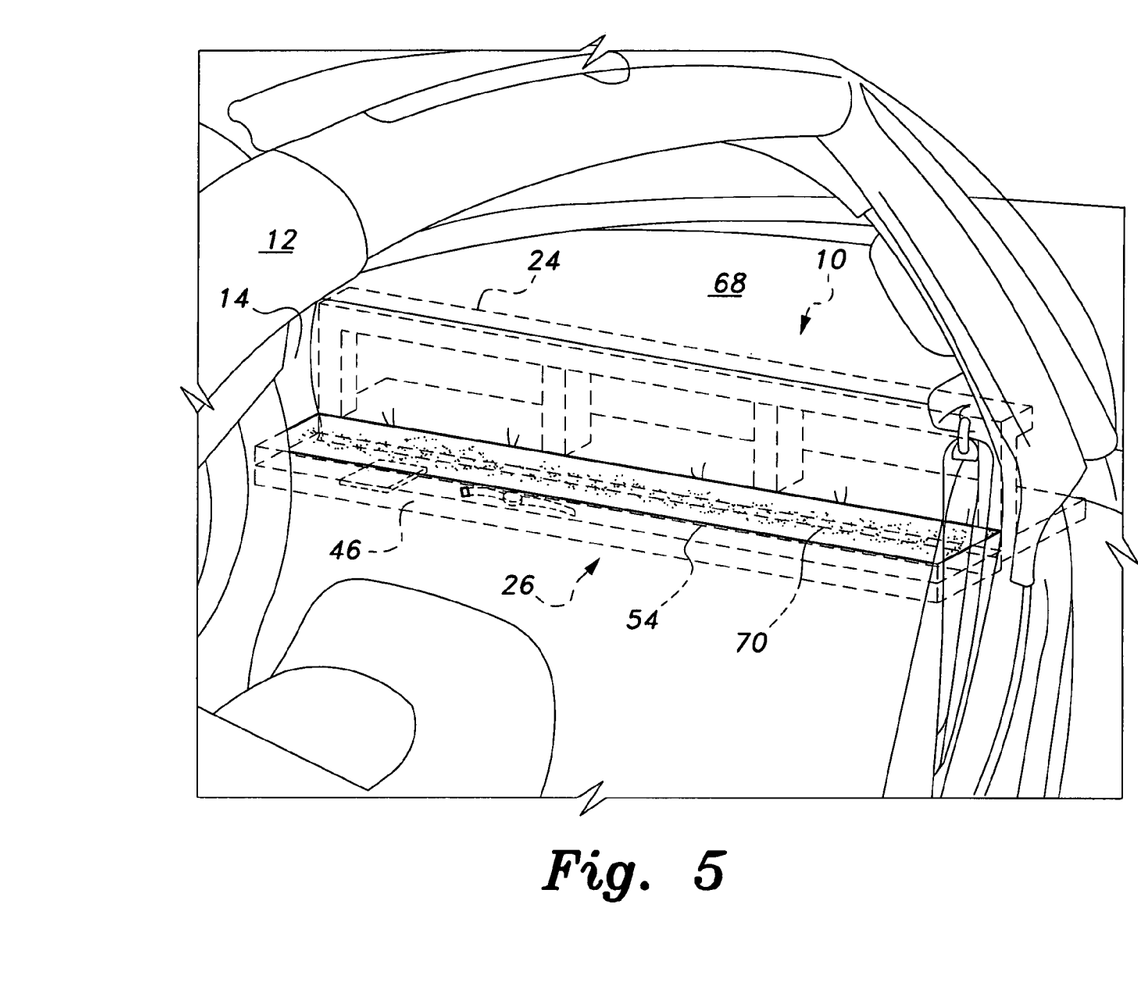
FIG. 5 is an environmental, perspective view of a storage apparatus for automobile removable roof panels according to the present invention showing a rear cargo cover being held in position by the storage apparatus.

Referring to FIG. 5, the storage apparatus 10 is seen as operatively disposed within the interior compartment 14 of the automobile 12. A hatchback or rear cargo cover 68 is draped over the roof panel rack 24 and tucked under the locking bar cover 48 which results in forward edge 70 of the rear cargo cover 68 being disposed between the locking bar 46 and the locking bar cover 48. Advantageously, this arrangement prevents the hatchback or rear cargo cover 68 from flapping or thrashing in the wind when the hardtop roof structure is opened while the automobile 12 is being driven.

Referring again to FIGS. 2A and 2B, the roof panel rack 24, the locking bar 46, and the locking bar cover 48 can be formed from any type of material including polymeric, ceramic, metal, wood, or any combination thereof. Preferably, the material used is a relatively lightweight material for ease of installing and removing the storage apparatus 10 from the automobile 12. For example, the material used to construct the roof panel rack 24, the locking bar 46, and the locking bar cover 48 can be wood, plastic, aluminum, rubber, or fiberglass.

The exterior surfaces of the storage apparatus 10 is lined or covered with a protective material that protects the interior compartment 14 of the automobile 12 and the removable roof panels 18, 20. For example, the exterior surfaces of the roof panel rack 24, the locking bar 46, and the locking bar cover 48 are lined or covered with a protective material, such as fabric, cloth, carpet, pad, foam, cushion, or rubber. Preferably, the protective material is carpeting that matches the interior carpet and/or color of the automobile for an aesthetic appearance.

It should be apparent from the foregoing that the storage apparatus 10 in accordance with the present invention may readily be installed or removed from the automobile 12 without having to fasten or anchor the storage apparatus 10 to the interior compartment 14. Moreover, it should be apparent that the roof panel rack 24, the locking bar 46, and the locking bar cover 48 frictionally engage the interior compartment 14 to create a wedge that locks and holds the storage apparatus 10 firmly and securely in position in relation to the interior compartment 14 of the automobile 12. Further, it should be apparent that the storage apparatus 10 is designed and configured to store any removable roof panels of any suitable hardtop automobiles and sports cars that come with removable roof panels.

It is to be understood that the present invention is not limited to the embodiments described above, but encompasses any and all embodiments within the scope of the following claims.

I claim:

1. A storage apparatus for automobile removable roof panels, comprising:
    a roof panel rack having a base member, a top member, and at least two support members;
    said at least two support members being joined to said base member and said top member such that said base member and said top member are separated by a distance substantially equal to said at least two support members;
    wherein said at least two support members are spaced apart from each other to provide support for holding the at least one removable roof panel and at least one locking bar;
    said roof panel rack being designed and configured to conform to an interior compartment of an automobile and to securely hold at least one removable roof panel within the interior compartment;
    wherein said base and top members extend transversely across the interior compartment; and
    said at least one locking bar operatively coupled to said roof panel rack and being designed and configured to secure at least one of the at least one removable roof panel.

2. The storage apparatus according to claim 1, wherein each one of said at least two support members includes at least one bearing support to supportively receive the at least one removable roof panel and said at least one locking bar.

3. The storage apparatus according to claim 2, wherein said at least two spaced apart support members include a forward facing wall, said forward facing wall having portion thereof extending inwardly to define a recess wall structure having at least one bearing surface for receiving the at least one removable roof panel and said at least one locking bar.

4. The storage apparatus according to claim 1, further comprising:
    a pair of side support members being joined to opposing ends of said base member and said top member.

5. The storage apparatus according to claim 1, further comprising:
    at least one protective cover being disposed on exterior surface of the at least one removable roof panel.

6. The storage apparatus according to claim 5, wherein said at least one protective cover being sandwiched between a pair of removable roof panel.

7. The storage apparatus according to claim 1, wherein said at least one locking bar being wedged between said base member and the interior compartment of the automobile for maintaining the position of said roof panel rack within the automobile.

8. The storage apparatus according to claim 1, further comprising:
    at least one locking bar cover being disposed on said at least one locking bar to facilitate holding said roof panel rack within the automobile.

9. The storage apparatus according to claim 1, wherein said at least one locking bar has a front wall, a back wall, and a pair of opposing end walls joining the front wall and the back wall to form a generally rectangular body having an open space defined therein for storing items.

10. The storage apparatus according to claim 1, wherein said storage apparatus is lined with a protective material for protecting the at least one removable roof panel and the interior compartment of the automobile.

11. The storage apparatus according to claim 10, wherein said protective material is carpeting.

12. A storage apparatus for automobile removable roof panels, comprising:
    a roof panel rack having a base member, a top member, and at least one support member;
    said at least two support members being joined between said base member and said top member such that said base member and said top member are separated by a distance substantially equal to said at least two support members;
    wherein said at least two support members are spaced apart from each other to provide support for holding the at least one removable roof panel and at least one locking bar;
    said roof panel rack being designed and configured to conform to an interior compartment of an automobile and to securely hold at least one removable roof panel;
    wherein said base and top members extend transversely across the interior compartment:
    said at least one locking bar operatively coupled to said roof panel rack and being designed and configured to secure at least one of the at least one removable roof panel; and
    at least one protective cover being disposed on the exterior surface of the at least one removable roof panel for protecting the at least one removable roof panel.

13. The storage apparatus according to claim 12, wherein said at least one locking bar is a rectangular platform.

14. The storage apparatus according to claim 13, wherein said rectangular platform has an open space therein for storing items.

15. The storage apparatus according to claim 12, wherein the storage apparatus is covered with carpeting.

16. A storage apparatus for automobile removable roof panels, comprising:
    a roof panel rack having a base member, a top member, and at least one longitudinal wall;
    said at least one longitudinal wall being joined to said base member and said top member such that said base member and said top member are separated by a distance substantially equal to said at least one longitudinal wall;
    said roof panel rack being designed and configured to conform to an interior compartment of an automobile and to securely hold at least one removable roof panel within the interior compartment;

wherein said base and top members extend transversely across the interior compartment:

a locking bar body having a locking bar and a locking bar cover disposed on said locking bar, said locking bar body operatively coupled to said roof panel rack; and at least one protective cover being disposed on the exterior surface of the at least one removable roof panel.

17. The storage apparatus according to claim 16, wherein said at least one longitudinal wall having a portion thereof extending outwardly to provide bearing support for receiving the at least one removable roof panel.

18. The storage apparatus according to claim 17, wherein said locking bar cover is operatively coupled to said bearing support for securing the at least one removable roof panel.

19. The storage apparatus according to claim 17, wherein said locking bar is operatively coupled to said bearing support for securing the at least one removable roof panel.

* * * * *